US009307575B2

(12) United States Patent
Lee

(10) Patent No.: US 9,307,575 B2
(45) Date of Patent: Apr. 5, 2016

(54) METHOD AND APPARATUS OF SUPPORTING UE RELAY FUNCTIONS

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

(*) Notice: Subject to any disclaimer, the term of this patent is extended or adjusted under 35 U.S.C. 154(b) by 133 days.

(21) Appl. No.: 14/079,444

(22) Filed: Nov. 13, 2013

(65) Prior Publication Data

US 2014/0133332 A1    May 15, 2014

Related U.S. Application Data

(60) Provisional application No. 61/725,962, filed on Nov. 13, 2012, provisional application No. 61/815,736, filed on Apr. 25, 2013, provisional application No. 61/897,799, filed on Oct. 30, 2013.

(51) Int. Cl.
*H04W 88/04* (2009.01)
*H04W 48/08* (2009.01)
*H04W 72/08* (2009.01)
*H04W 76/02* (2009.01)
*H04W 40/12* (2009.01)
*H04W 40/22* (2009.01)

(52) U.S. Cl.
CPC ............. *H04W 88/04* (2013.01); *H04W 48/08* (2013.01); *H04W 40/12* (2013.01); *H04W 40/22* (2013.01); *H04W 72/085* (2013.01); *H04W 76/023* (2013.01)

(58) Field of Classification Search
None
See application file for complete search history.

(56) References Cited

U.S. PATENT DOCUMENTS

2010/0279686 A1    11/2010    Tokgoz et al.
2013/0294433 A1    11/2013    Hsu et al.

FOREIGN PATENT DOCUMENTS

WO    WO 2011/153507 A2    12/2011

OTHER PUBLICATIONS

3GPP, 3rd Generation Partnership Project; Technical Specification Group SA; Feasibility Study for Proximity Services (ProSe) (release 12), Aug. 2012.*
Liu et al., "Signal Strength based Service Discovery (S3D) in Mobile Ad Hoc Networks", 2005 IEEE 16th International Symposium on Personal, Indoor and Mobile Radio Communications, Sep. 14, 2005, pp. 811-815.

* cited by examiner

*Primary Examiner* — Vincelas Louis
(74) *Attorney, Agent, or Firm* — Birch, Stewart, Kolasch & Birch, LLP

(57) ABSTRACT

A method and a Public Safety ProSe-enabled User Equipment (UE) for use in a wireless communication system. The method according to one embodiment includes performing ProSe by the Public Safety ProSe-enabled UE in a cellular communication system. The Public Safety ProSe-enabled UE is a member of a ProSe Group, and at least one UE of the ProSe Group is not served by a cellular network. In addition, the method according to the embodiment is performed by checking whether the Public Safety ProSe-enabled UE is in a location served by the cellular network and transmitting first information related to the ProSe Group from the ProSe Group to the cellular network if a condition is satisfied.

10 Claims, 12 Drawing Sheets

METHOD AND APPARATUS OF SUPPORTING UE RELAY FUNCTIONS

CROSS REFERENCE TO RELATED APPLICATIONS

This nonprovisional application claims the benefit of U.S. Provisional Application Nos. 61/725,962, 61/815,736, and 61/897,799 filed on Nov. 13, 2012, Apr. 25, 2013, and Oct. 30, 2013, respectively. All of which are hereby expressly incorporated by reference into the present application.

TECHNICAL FIELD

The present invention is directed to a method and an apparatus for use in a wireless communication system. Specifically, the present invention is directed to a method and an apparatus of supporting User Equipment (UE) relay functions.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE

Technical Problem

An object of the present invention is to provide a method and an apparatus of efficiently supporting UE relay functions over a cellular network. The UE relay functions can be provided by a Proximity-based Service (ProSe)-enabled UE served by the cellular network.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the present invention, a method of performing a procedure for a Proximity-based Service (ProSe) by a ProSe-enabled User Equipment (UE) served by a network in a cellular communication system is provided, in which the method comprises: receiving system information including authorization of announcing network reachability information from a base station of the network; measuring a strength Pa of downlink signals received from the base station; and performing a procedure for broadcasting the network reachability information, wherein the broadcasting is performed during a condition is satisfied, and the condition includes that Pa is lower than a first threshold value for a predetermined period.

Preferably, the network reachability information may include a hop count used to indicate a maximum number of the allowed relay hops.

Preferably, the network reachability information may include identification information for the ProSe-enabled UE.

Preferably, the method may further comprise: receiving a request for connecting the network via the ProSe-enabled UE from another ProSe-enabled UE, the request including information indicating whether the another ProSe-enabled UE is served by the network or not, wherein if the another Pro Se-enabled UE is served by the network, the request is discarded, wherein if the another ProSe-enabled UE is not served by the network, a response including information indicating whether the request is granted or not is transmitted to the another ProSe-enabled UE.

Preferably, the method may further comprise: receiving a request for connecting the network via the ProSe-enabled UE from another ProSe-enabled UE, the request including information indicating a strength Pb of downlink signals measured by the another ProSe-enabled UE, wherein if (Pa−Pb) is lower than a second threshold value, the request is discarded, wherein if (Pa−Pb) is greater than or equal to the second threshold value, a response including information indicating whether the request is granted or not is transmitted to the another ProSe-enabled UE.

Preferably, transmission power of the network reachability information may be related to Pa.

Preferably, the network may include an Evolved UMTS Terrestrial Radio Access Network (E-UTRAN).

As another aspect of the present invention, a Proximity-based Service (ProSe)-enabled User Equipment (UE) configured to perform a procedure for a ProSe in a cellular communication system is provided, wherein the ProSe-enabled is served by a network and comprises: a radio frequency (RF) unit; and a processor, wherein the processor is configured: to receive system information including authorization of announcing network reachability information from a base station of the network, to measure a strength Pa of downlink signals received from the base station, and to perform a procedure for broadcasting the network reachability information, wherein the broadcasting is performed during a condition is satisfied, and the condition includes that Pa is lower than a first threshold value for a predetermined period.

Preferably, the network reachability information may include a hop count used to indicate a maximum number of the allowed relay hops.

Preferably, the network reachability information may include identification information for the ProSe-enabled UE.

Preferably, the processor may be further configured: to receive a request for connecting the network via the ProSe-enabled UE from another ProSe-enabled UE, the request including information indicating whether the another ProSe-enabled UE is served by the network or not, wherein if the another Pro Se-enabled UE is served by the network, the request is discarded, wherein if the another ProSe-enabled UE is not served by the network, a response including information indicating whether the request is granted or not is transmitted to the another ProSe-enabled UE.

Preferably, the processor may be further configured: to receive a request for connecting the network via the ProSe-enabled UE from another ProSe-enabled UE, the request including information indicating a strength Pb of downlink signals measured by the another ProSe-enabled UE, wherein if (Pa−Pb) is lower than a second threshold value, the request is discarded, wherein if (Pa−Pb) is greater than or equal to the second threshold value, a response including information indicating whether the request is granted or not is transmitted to the another ProSe-enabled UE.

Preferably, transmission power of the network reachability information may be related to Pa.

Preferably, the network may include an Evolved UMTS Terrestrial Radio Access Network (E-UTRAN).

Advantageous Effects

Exemplary embodiments of the present invention have the following effects. In accordance with the embodiments of the present invention, UE relay function can be efficiently supported over a cellular network. The UE relay functions can be provided by a ProSe-enabled UE served by the cellular network.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE—Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
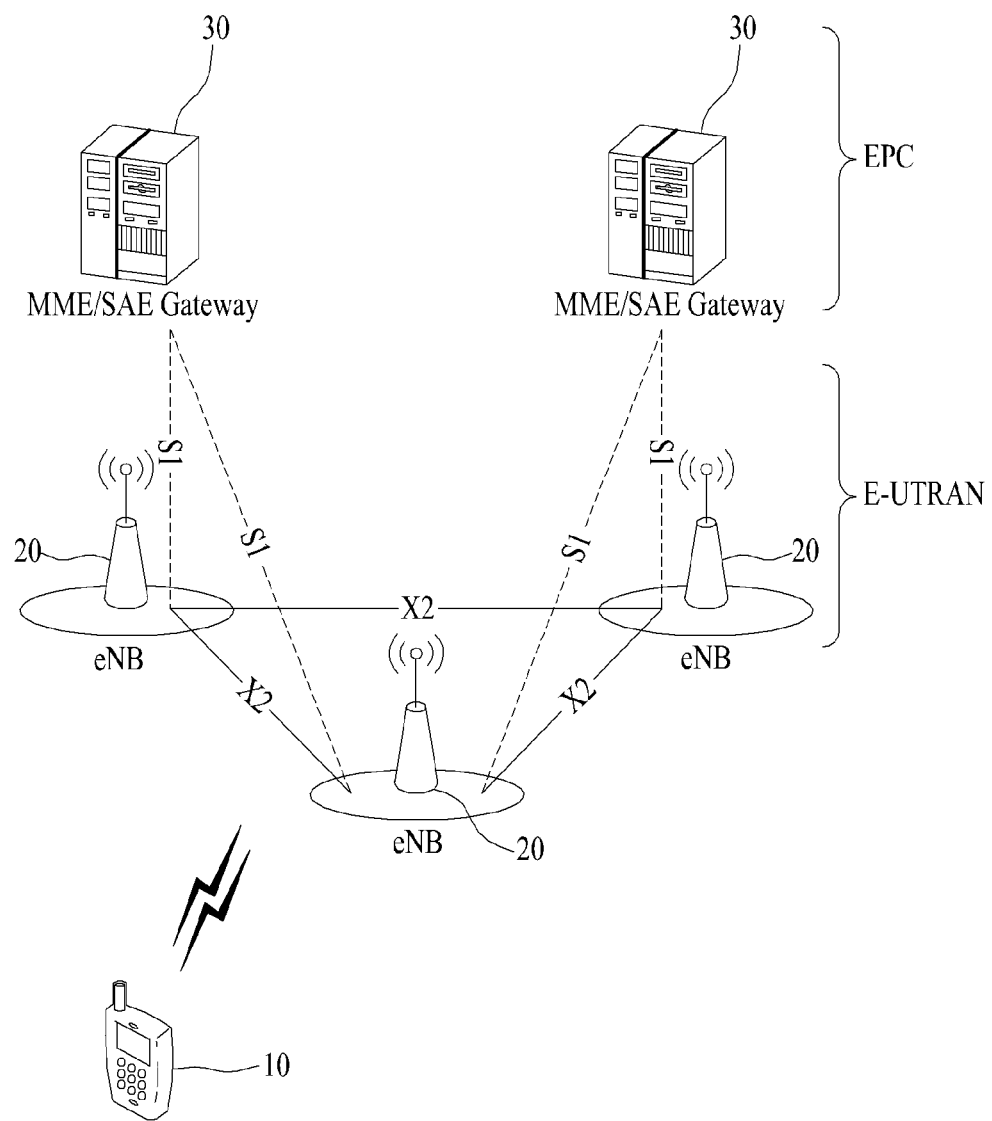
FIG. 1 illustrates a network structure of an Evolved Universal Terrestrial Radio Access Network (E-UTRAN).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downlink (DL)" refers to communication from the eNB 20 to the UE 10, and "uplink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
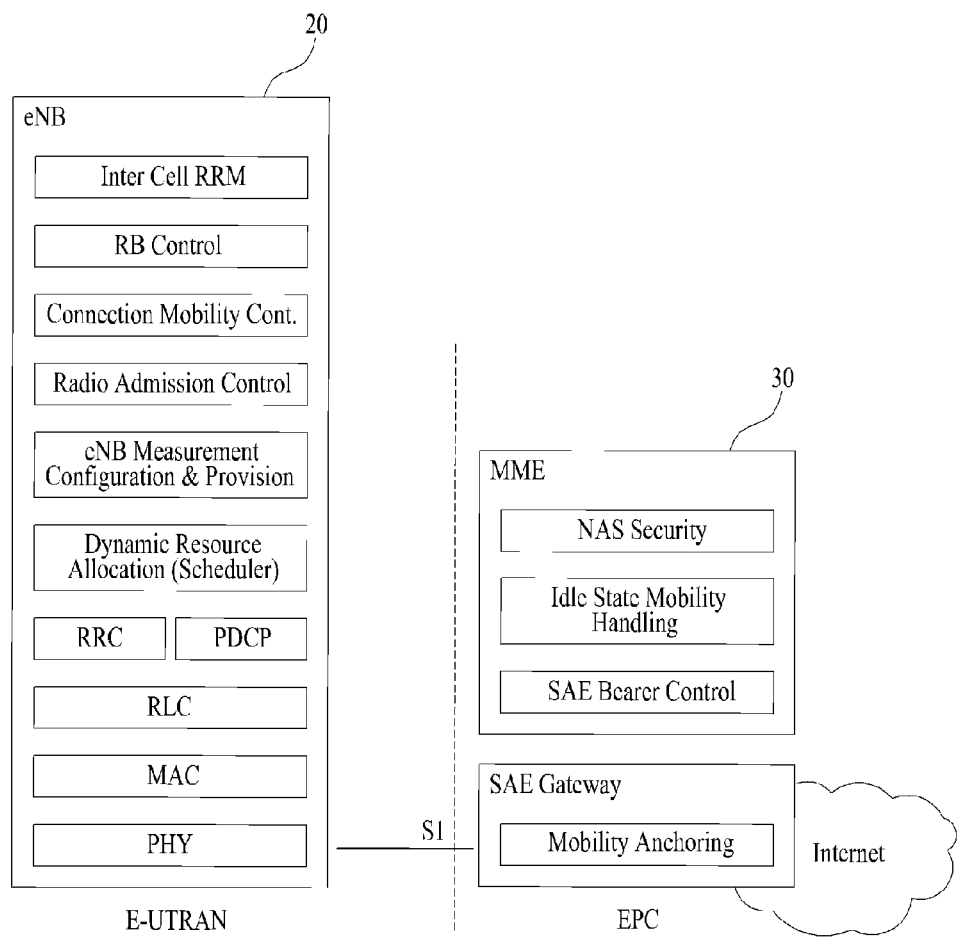
FIG. 2 illustrates a general functional structure of a typical E-UTRAN and that of a typical Evolved Packet Core (EPC).

FIG. 2 is a block diagram depicting general structures of an E-UTRAN and an EPC. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
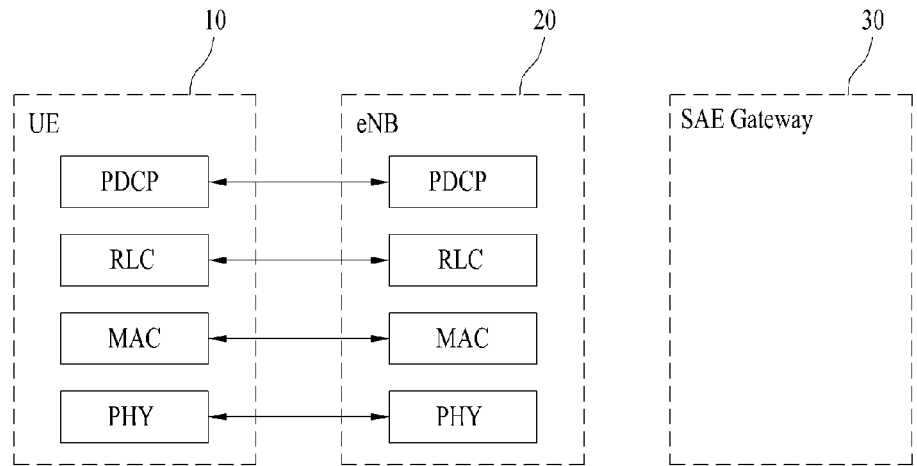
FIGS. 3a~3b illustrate a user-plane protocol and a control-plane protocol stack for the E-UMTS network
Figure 3B:
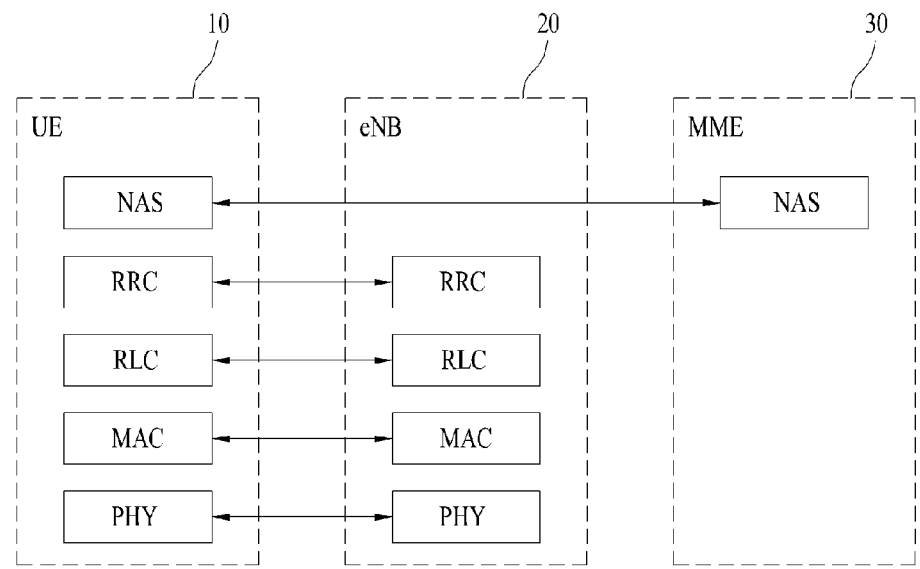

FIGS. 3a~3b illustrate the user-plane protocol and the control-plane protocol stack for the E-UMTS network. Referring to FIGS. 3a~3b, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a~3b as being separate from the MAC layer, it is understood that the functions of the RLC layer may be performed by the MAC layer and that, therefore, a separate RLC layer is not required. Referring to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

Referring to FIG. 3a, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution—Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

Figure 4:
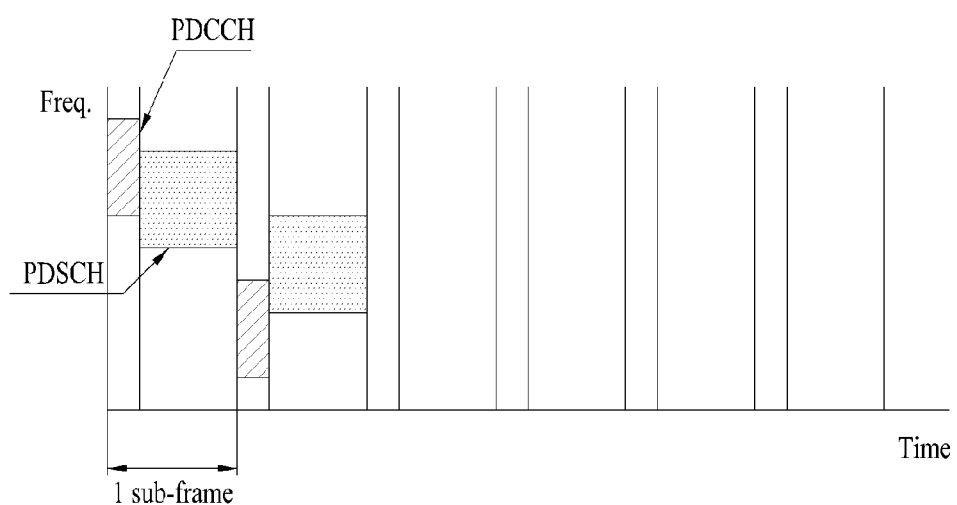
FIG. 4 illustrates a downlink subframe and physical channels.

FIG. 4 illustrates a downlink subframe and physical channels.

Referring to FIG. 4, the downlink subframe includes a plurality of slots (e.g., two).

The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE/LTE-A, for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:
  A UE switches from power-off to power-on and needs to be registered to the network.
  A UE is not time-synchronized with an eNB and starts transmitting data (for instance the user calls).
  An eNB starts transmitting data to the UE but they are not synchronized (for instance the user receives a call).
  An eNB measures a delay of the received signal from the UE (for instance the user is moving and has lost synchronization).

Figure 5:
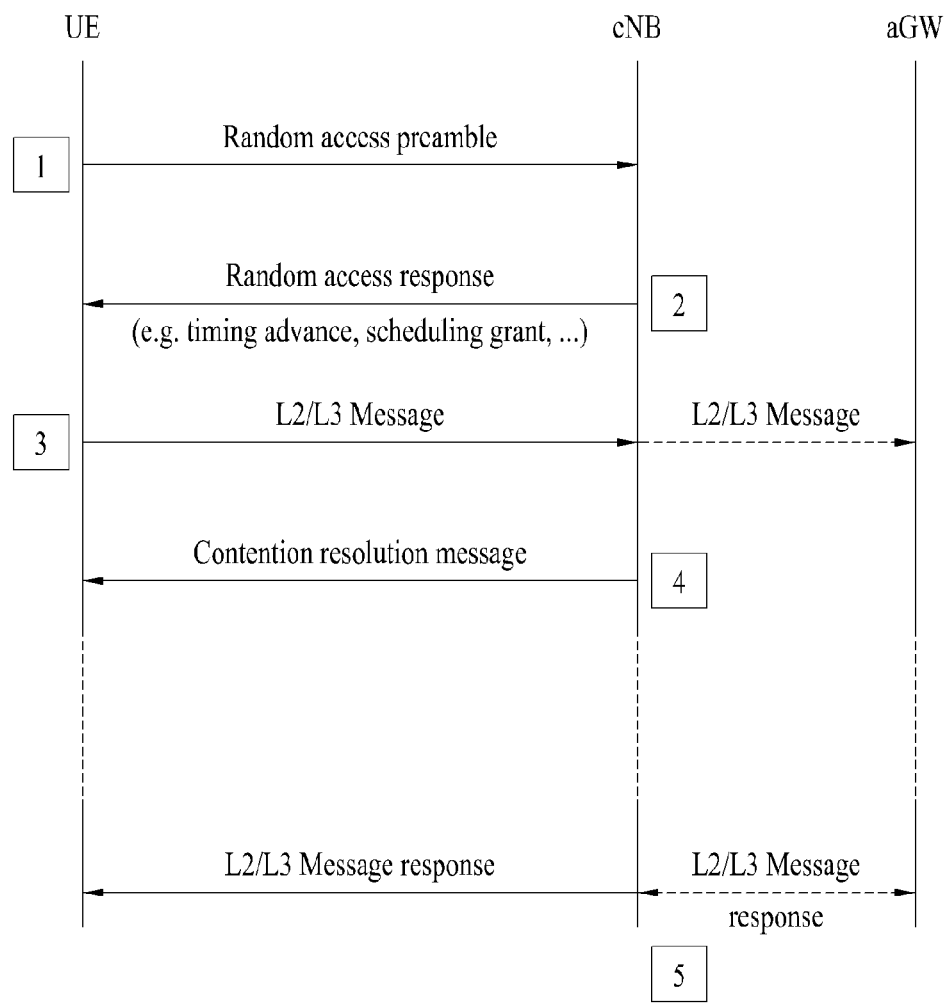
FIG. 5 illustrates a contention-based random access procedure.

FIG. 5 illustrates a contention-based random access procedure.

Referring to FIG. 5, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response and adapts UL transmission timing, and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to restart the RACH procedure. If the UE was not in collision, the eNB sends a resource assignment message (message 5, box 5). Subsequent transmissions are carried out as usual.

Recently, Proximity-based Service (ProSe) has been discussed in 3GPP. The ProSe enables different UEs to discover each other (if authorized to do so) and to be connected (directly) to each other (after appropriate procedure(s), such as authentication), connected through a local eNB only (but not further through Serving Gateway (SGW)/Packet Data Network Gateway (PDN-GW, PGW)), or connected through SGW/PGW (this is referred to as EPC (Evolved Packet Core) Path in 3GPP Release 12).

Figure 6:
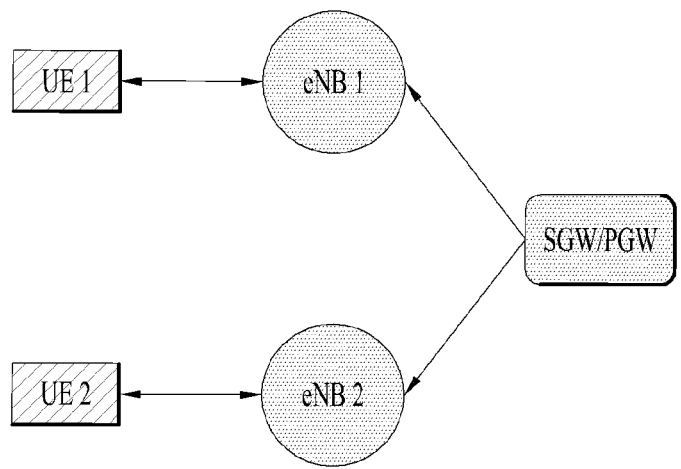
FIGS. 6~8 illustrate examples of data path scenarios for a proximity communication.
Figure 7:
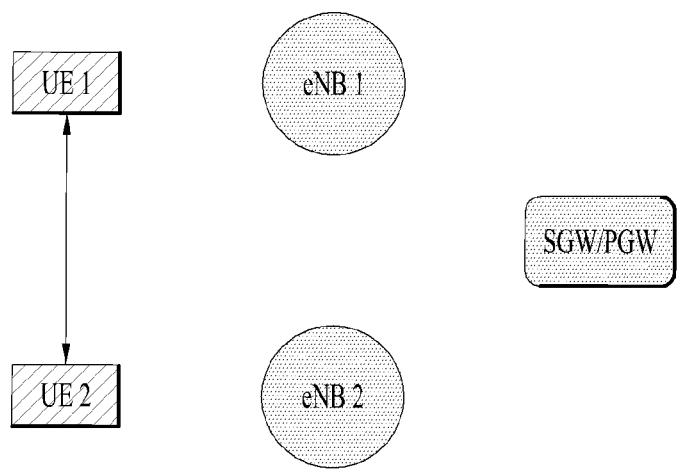
Figure 8:
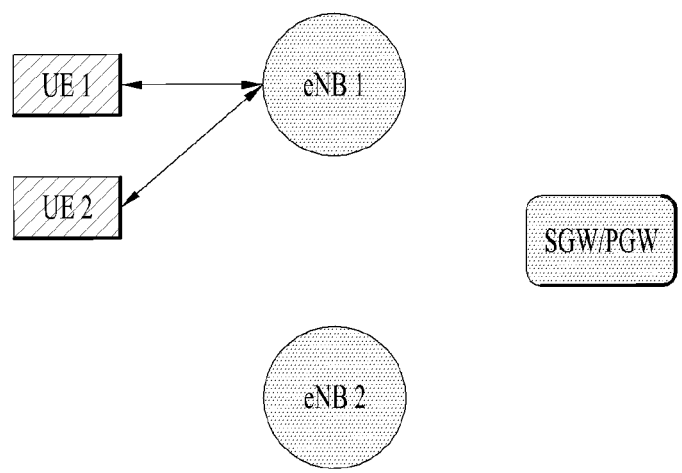

FIGS. 6-8 illustrate Communication Path (or data path) scenarios for a proximity-based service.

FIG. 6 shows an EPC Path (or a default data path) in Evolved Packet System (EPS) for communication between two UEs (Scenario 1). When two UEs (e.g., UE1, UE2) in close proximity communicate with each other, their data path (user plane) goes via the operator network. Typical data path for this type of communication involves eNB(s) and/or Gateway(s) (GW(s)) (e.g., SGW/PGW). FIGS. 7-8 show ProSe Communication Paths for a proximity communication (Scenario 2). If wireless devices (e.g., UE1, UE2) are in proximity of each other, they may be able to use a direct ProSe Communication Path (FIG. 7) or a locally routed ProSe Communication Path (FIG. 8) for communication between two UEs. In the direct ProSe Communication Path, wireless devices are connected directly each other (after appropriate procedure(s), such as authentication), without being connected to/through eNB and SGW/PGW. With the use of setting up direct communication path between two or more UEs, the ProSe can realize the concept of "mobile ad hoc" network (so-called Mobile Network, MONET). In the locally routed ProSe Communication Path, wireless devices are connected to each other through a local eNB only but not through the SGW/PGW.

The ProSe has various use cases and potential requirements for an operator network controlled discovery and communications between wireless devices that are in proximity, under continuous network control, and are served by E-UTRAN, for:
 1. Commercial/social use
 2. Network offloading
 3. Public Safety
 4. Integration of current infrastructure services, to assure the consistency of the user experience including reachability and mobility aspects
 5. Public Safety In particular, Public Safety has a wide spectrum of applications. For example, in the United States, it includes the following:
 Fire and Rescue services—fire prevention and suppression, all types of rescue services.
 Ambulance and Emergency Medical Service (EMS)—usually only provides emergency medical transportation
 Police and security guard licensing services—including crime prevention, suppression and investigation, uniformed patrol and response, and operates the Crimestoppers Program.
 Emergency communications—operates the public interface emergency communications telephone system by providing the 9-1-1 and Enhanced 911 emergency telephone numbers.
 Office of Emergency Services (OES)—plans for and operates the Emergency Operations Center during calamities, disasters, special events and emergencies.
 Inspections and code enforcement—building safety, which includes construction, electrical et al. and/or vehicle inspections.
 Animal control—wildlife officers, game wardens and dog catchers.
 DMV—includes administration of driver's licenses and license plates.

EXAMPLE

Indication of Network Reachability Information to Support UE Relay

For convenience, following abbreviations and definitions are used:
 MOCN: Mobile Operator Core Network.
 Group Communication System Enabler (GCSE): A 3GPP feature enabling an application layer functionality to provide group communication over E-UTRAN.
 GCSE Group: A set of members entitled to participate in the group communication service.
 Network Coverage: Cellular network coverage, e.g., 3GPP network coverage
 Multipoint Service: A service used to distribute the same content to many UEs in a resource efficient way.
 UEa.b: UE #b of GCSE group #a. In the description, unless mentioned otherwise, UE may mean a ProSe-enabled UE, preferably a Public Safety ProSe-enabled UE.
 iUE: in-network ProSe-enabled UE, i.e., a ProSe-enabled UE served by the network.
 oUE: out-of-network ProSe-enabled UE, i.e., a ProSe-enabled UE not served by the network because it is not located within the service coverage area.

Figure 9:
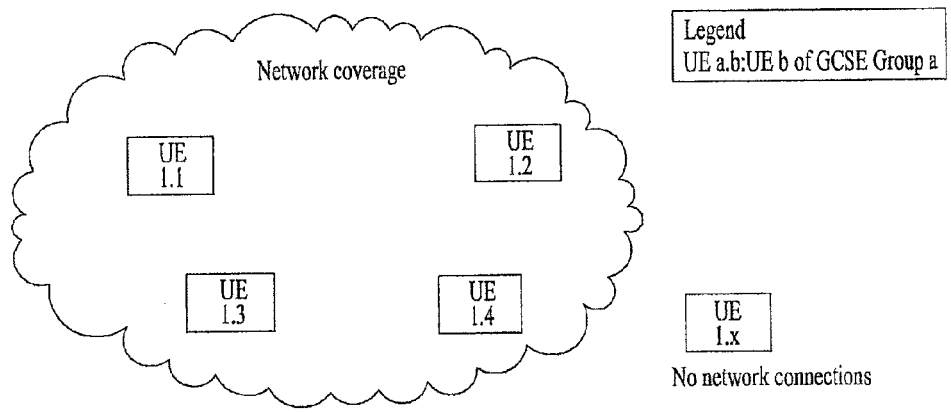
FIG. 9 illustrates a network-assisted Public Safety ProSe procedure in accordance with an example of the present invention.

FIG. 9 illustrates a problem of group communication in prior art.

Referring to FIG. 9 a GCSE Group includes five GCSE members (UE1.1~UE1.4 and UE1.x) with one GCSE member (UE1.x) located outside network coverage: in-network UEs are UE1.1, UE1.2, UE1.3 and UE1.4, and out-of-coverage UE is UE1.x. Generally there can be more than two GCSE members who do not have network coverage. In this case, it is not possible to get connected for the out-of-coverage UE (i.e., UE1.x) to a network or a related service center, and therefore UE1.x has no network connections. However, for example, in case of Public Safety situation, due to the ubiquitous nature of a place that Public Safety officers are dispatched to, it is necessary that the GCSE architecture and/or protocols should be designed in a way to maximize the network connectivity as much as possible.

In order to address the problem, the present invention proposes to use a UE served by a network as a ProSe UE-to-Network Relay for a UE located outside network coverage. To this end, the present invention also proposes to provide network reachability information to support UE relay functions. By allowing a ProSe-enabled UE to announce network reachability information when it is served by E-UTRAN, other ProSe-enabled UEs, which are located outside network coverage but located within its proximity, are able to kick off a procedure to make a connection to a network or a related service center through a ProSe UE-to-Network Relay. Here, the network reachability information may include a network reachability indication. The network reachability indication may be used to indicate that available network is in proximity. In addition, the network reachability information may further include a hop count. The hop count may be used to limit a maximum number of allowed relay hops (e.g., 1-hop only, 2-hops only, n-hop only (e.g., multiple hop extension)) of the network reachability information. The hop count may be set to the maximum number of allowed relay hops, and then decreased by '1' per hop. In this case, if the hop count becomes '0', no further relay is allowed. Alternatively, the hop count may be set to '0', and then increase by '1' per hop. In this case, if the hop count reaches the maximum number of allowed relay hops, no further relay is allowed. In addition, the network reachability information may further include at least part of system information of the network (or serving eNB of the network). For example, the network reachability information may include information for indicating at least one of carrier frequency, system bandwidth, BS Identifier (ID), Physical Hybrid ARQ Indicator Channel (PHICH) duration, the number of PHICH groups.

In the present invention, a ProSe-enabled UE may be capable of informing other ProSe-enabled UE(s) within communication range of network reachability indication at least if it is authorized to act as a relay and served by E-UTRAN. Also, other ProSe-enabled UE within communication range of an informing UE may be capable of receiving the network reachability indication regardless of whether or not it has been discovered by the informing UE.

Hereinafter some possible examples that can be achieved by the use of the proposed invention will be explained with referring to figures.

Figure 10:
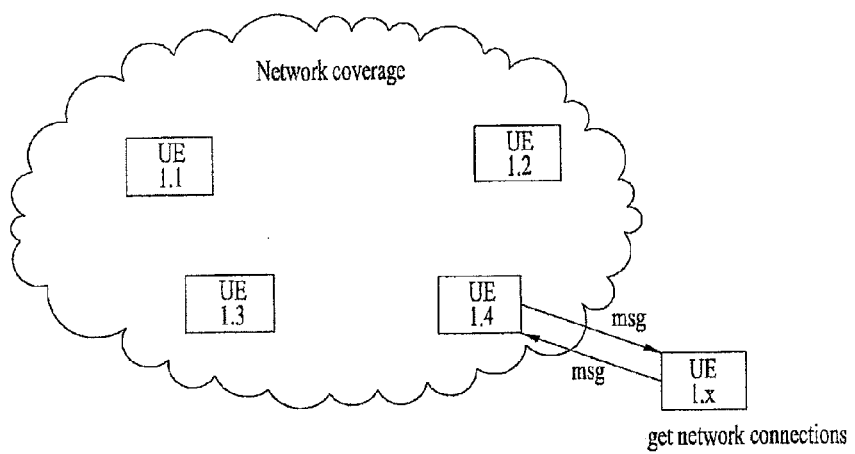
FIG. 10 illustrates a Group Communication System Enabler (GCSE) group in which one or more GCSE members are outside network coverage.

FIG. 10 shows a single hop example of GCSE Group with five GCSE members with one GCSE member (UE1.x) outside the network coverage. Here, UE 1.4 can act as a ProSe UE-to-Network Relay for UE 1.x. Thus UE1.x could be connected to the network through UE acting as GCSE UE Relay using Proximity Services between UE1.4 and UE1.x. There can be more than two members providing connections to out-of-network members in general.

Figure 11:
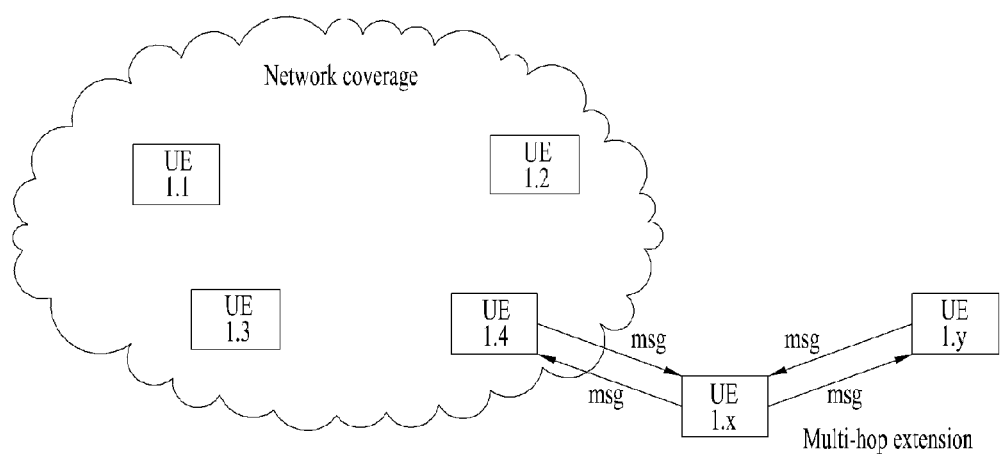
FIG. 11 illustrates example of performing GCSE group communication in accordance with the present invention.

FIG. 11 shows a multi-hop example of GCSE Group with five GCSE members with two GCSE members (UE 1.x and UE1.y) outside the network coverage. Here, UE 1.4 can act as a ProSe UE-to-Network Relay for UE 1.x. Thus UE1.x could be connected to the network through a UE acting as GCSE UE Relay using Proximity Services between UE1.4 and UE1.x. In addition, UELy could be connected to the network through UE1.x and a UE acting as GCSE UE Relay using Proximity Services between UE1.4, UE1.x and UE1.y.

In particular, actions of operator (or network node), in-network ProSe-enabled UE, Out-of-Coverage ProSe-enabled UE are as follows.

Action of the Operator (or Network Node): Operator's Network to UE

Mobile Operator Core Network (MOCN) may provide, through eNB, at least one of the following information to ProSe-enabled UEs (through signaling or by allowed method, e.g., online/offline downloading).

1-1. Information necessary to initialize ProSe-enabled UE relaying (hereinafter, 1-1 information):

a. Authorization of announcing network reachability information (indication).

b. The channel to read. The channel is used to monitor signals of other ProSe-enabled UE's access request (e.g., random access preamble, RRC connection request).

c. The period of reading the channel.

d. The (relative) time to read the channel, for example, time relative to the start of the radio frame including the channel in unit of radio frame or subframe.

e. The signal power information used for controlling announcement of the network reachability information (indication) and for controlling access request from other UEs.

f. The number of UE Relaying hops allowed, from the first UE Relay: zero indicates no UE Relaying is allowed. If MOCN or Operator notifies in-network UE of the number of hops allowed, the UE's involved in UE Relaying may include the hop count (how many hops the current UE (myself) is apart from the network: e.g., '0' means that I am in network; '1' means that I am not in the network but only one hop away from the in-network node in terms of UE Relying) in the message toward subordinate UEs (i.e., out-of-coverage UE that I am serving).

Above information may be informed to ProSe-enabled UEs before they (or some of them) are getting out of the network coverage area. If the above information is not available to the ProSe-enabled UEs, another solution may be needed so that the ProSe-enabled UEs can be aware of the above information. Some examples of the solutions may include (1) hardcoding (2) software based downloading (3) application based downloading (e.g., through WiFi connection).

1-2. Information necessary to maintain the ProSe-enabled UE relaying (hereinafter, 1-2 information):

a. The channel quality information for the ProSe-enabled UE: by this information, the ProSe-enabled UE can estimate accommodation capability about accommodation of other out-of-network ProSe-enabled UEs, e.g., how many connections, the minimum data rate, and so on.

The accommodation capability information may be subject to a subscription type (e.g., premium, regular, etc.). Therefore, the MOCN can allow a limited capability for the in-network ProSe-enabled UE to accommodate other UEs based on what the subscription allows to do.

Action of In-Network ProSe-Enabled UEs (UEs Providing Network Connections): from In-Network UE to Out-Of-Network UE(s)

ProSe-enabled UEs located in the network coverage (i.e., UEs served by E-UTRAN), which are acting or are supposed to act as a ProSe-enabled UE-to-Network Relay, may provide the following information for ProSe-enabled UEs out of the network coverage. In-network UEs (i.e., UEs served by E-UTRAN) do not necessarily need to know the existence of out-of-coverage UEs.

2-1. Broadcast/transmit the following information (hereinafter, 2-1 information):

a. My ID: uniquely identifies myself in the GCSE Group b. In-network coverage status (whether served by E-UTRAN or not): on/off; this information can be integrity-protected.

c. Accommodation capability: number of UEs acceptable, max data rate. If the number of UEs is set to zero, it means that access is barred or no UE relaying service is available.

d. When connected, hop count of myself.

Broadcast/transmission of the information mentioned above can be through the use of ProSe communication if both UEs (transmitting and receiving UEs) are ProSe-enabled and within proximity (or communication range).

In order to support above operations, ProSe-enabled UEs located in the network coverage may be configured to have the following functions:

3-1. Access barring 3-2. Connection admission control (similar to the function of RRC Connection Reject)

3-3. Admitted Time Length (as far as admission is available): for how long (seconds, minutes, hours, etc.), out-of-coverage UE is allowed to use in-network UE for UE relaying.

Action of the Out-of-Coverage ProSe-Enabled UEs (UEs Obtaining Network Connections through Other Prose-Enabled UE Acting as a Relay): at Out-Of-Network UE (to Another Out-Of-Network UE(s) in Multiple-Hop Case)

ProSe-enabled UEs located out of the network coverage may provide the following information for ProSe-enabled UEs in the network coverage when it attempt to get network connections through GCSE UE Relaying. Out-of-coverage UEs do not necessarily need to know the existence of In-network UEs.

4-1. Broadcast the following information (hereinafter, 4-1 information):
   a. My ID: uniquely identifies myself in the GCSE Group
   b. In-network coverage status: on/off
   c. Accommodation demand feature: minimum data rate, connection/application type to use.
   d. If multi-hop UE Relaying is allowed, the out-of-coverage UE may send out the same set of information as in-network UE does for the out-of-coverage UE (myself).

When I (out-of-network UE) accommodated another out-of-coverage UE, based on the received hop count from upper UE (who is serving myself), may increase the hop count by one to send it to the subordinate UE (whom I will serve).

Figure 12:
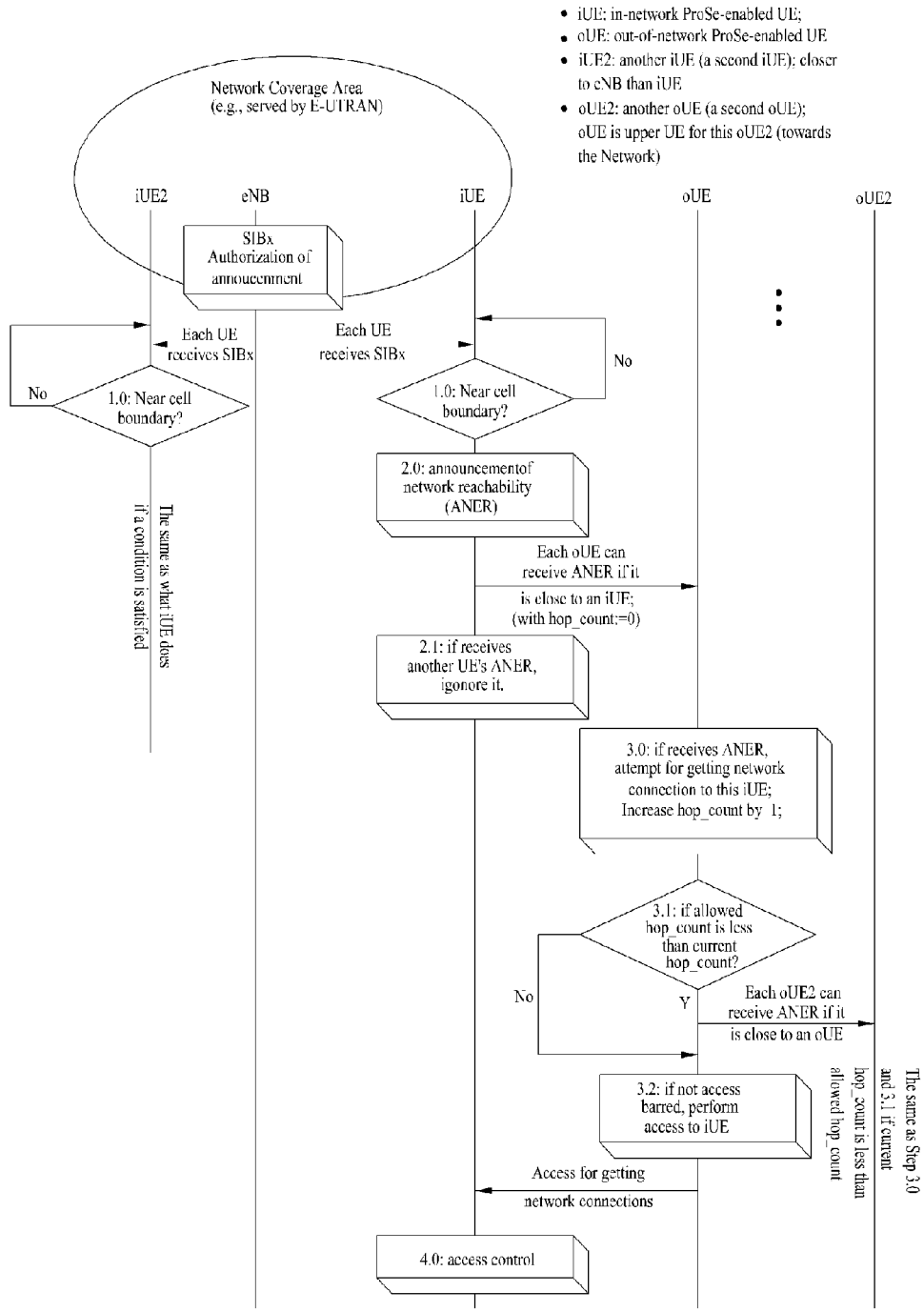
FIG. 12 shows an example of event flow in accordance with the present invention.

FIG. 12 shows an example of event flow in accordance with the present invention.

Referring to FIG. 12, MOCN may provide, through eNB, at least one of the 1-1/1-2 information to ProSe-enabled UEs (through signaling or by allowed method, e.g., online/offline downloading). The 1-1/1-2 information may be transferred to the ProSe-enabled UE as a part of System Information Block (SIB). The 1-1/1-2 information may include authorization of announcing network reachability information (indication). In addition, MOCN may configure that only cell-boundary ProSe-enabled UEs can announce network reachability information (indication). In case of Out-of-coverage UE (oUE), the 1-1/1-2 information may be provided when the oUE was in the network coverage, stored at the oUE before it is dispatched, or downloaded to the oUE using App based method (e.g., through WiFi connection). ProSe-enabled UEs may be able to perform some or all of the following procedures based on information from MOCN (e.g., the 1-1/1-2 information).

Step 1.0 [iUE]: if MOCN may configure that only cell-boundary ProSe-enabled UEs can announce network reachability information (indication), in-network UE (iUE) may periodically check whether it is near cell boundary. To this end, for example, iUE may measure a strength Pa of downlink signals received from the eNB, and check whether Pa is lower than a threshold value TH1. If Pa is lower than the threshold value TH1, iUE may determine that it is near cell-boundary and perform below steps. Meanwhile, if iUE may determine that it is not near cell-boundary, it repeats the Step 1.0.

Step 2.0 [iUE]: iUE may perform Announcement of Network Reachability (ANER) via a broadcast channel during a condition is satisfied. Thus, each oUE can receive ANER if it is close to the iUE. ANER may include at least one of the 2-1 information. Here, the condition may include that Pa is lower than the threshold value TH1 for a predetermined period. The time period may be also signaled from MOCN through eNB. The network reachability information (indication) may include identification information for the iUE. In this case, ANER may be used to announce which iUE is available for UE relaying in procedure of network access. The network reachability information (indication) may include a hop count used to limit a maximum number of the allowed relay hops. The hop count may be initially set to 0. In addition, for the purpose of ANER, the announcing UE (e.g., iUE) may include some bits regarding ANER in the message of discovery purpose (e.g., beacon with augmented information regarding ANER). In addition, transmission power of ANER (i.e., network reachability information) may be related to Pa. For example, Transmission power of ANER (i.e., network reachability information) may be given as n*Pa+m or n/Pa+m, where n is a positive value, and m is an offset value. In the description, ANER may be interchangeably used with network reachability information or network reachability indication.

Step 2.1 [iUE]: After performing ANER, the iUE may listen to other UE's signals. In this procedure, if the iUE receives another iUE's ANER, the iUE ignores it.

Step 3.0 [oUE]: If oUE receives ANER, it may perform a procedure (e.g., Step 3.2) for getting network connection to the iUE. In addition, the oUE may increase the hop count in the ANEN by 1: i.e., hop count may be updated to previous hop count+1.

Step 3.1 [oUE]: If allowed hop count is greater than the updated hop count (i.e., current hop count), the oUE may broadcast ANER including the updated hop count for relaying ANER to another oUEs. Thus another oUE (e.g., oUE2) can receive ANER if it is close to the iUE.

Step 3.2 [oUE]: If the oUE is not access barred, oUE may listen to find out possible chances; the frequency channel and timing information to read/scan can be pre-configured for oUEs, and such information may also be broadcast by the iUE which is allowed to broadcast such information. Upon finding chances (there is some in-network UE), the oUE may transmit a request for an access to the network. The request may include at least one of the 4.1 information. As an example of requesting the access, the oUE may perform a random access procedure (see, FIG. 5, in which eNB is replaced with iUE, and UE is replaced with oUE), then may perform a procedure for establishing RRC connection with the iUE. The iUE can also broadcast information that is needed for oUE to perform access (e.g., Random Access) to get network connections, as a part of ANER. For example, ANER may include information related with RACH resources (e.g., transmission occasions (e.g., period, offset), a frequency band, a root sequence index, a cyclic shift value).

Step 4.0 [iUE]: If the iUE receives a request for an access (e.g., RRC connection request) from the oUE, the iUE has a right to accommodate or reject the access request. Whether to accommodate or reject the access request may be determined based on accommodation capability (see, 1-2 information). For example, when the iUE receives a request for connecting the network from another ProSe-enabled UE, the request may include information indicating whether another ProSe-enabled UE is served by the network or not. In this case, if the another ProSe-enabled UE is served by the network, the request is discarded, and if the another Pro Se-enabled UE is not served by the network, a response including information indicating whether the request is granted or not is transmitted to the another ProSe-enabled UE. In particular, when the iUE receives a request for connecting the network from another ProSe-enabled UE, the request may include information indicating a strength Pb of downlink signals measured by the another Pro Se-enabled UE. In this case, if (Pa−Pb) is lower than a threshold value TH2, the request is discarded, and if (Pa−Pb) is greater than or equal to the threshold value TH2, a response including information indicating whether the request is granted or not is transmitted to the another ProSe-enabled UE.

Figure 13:
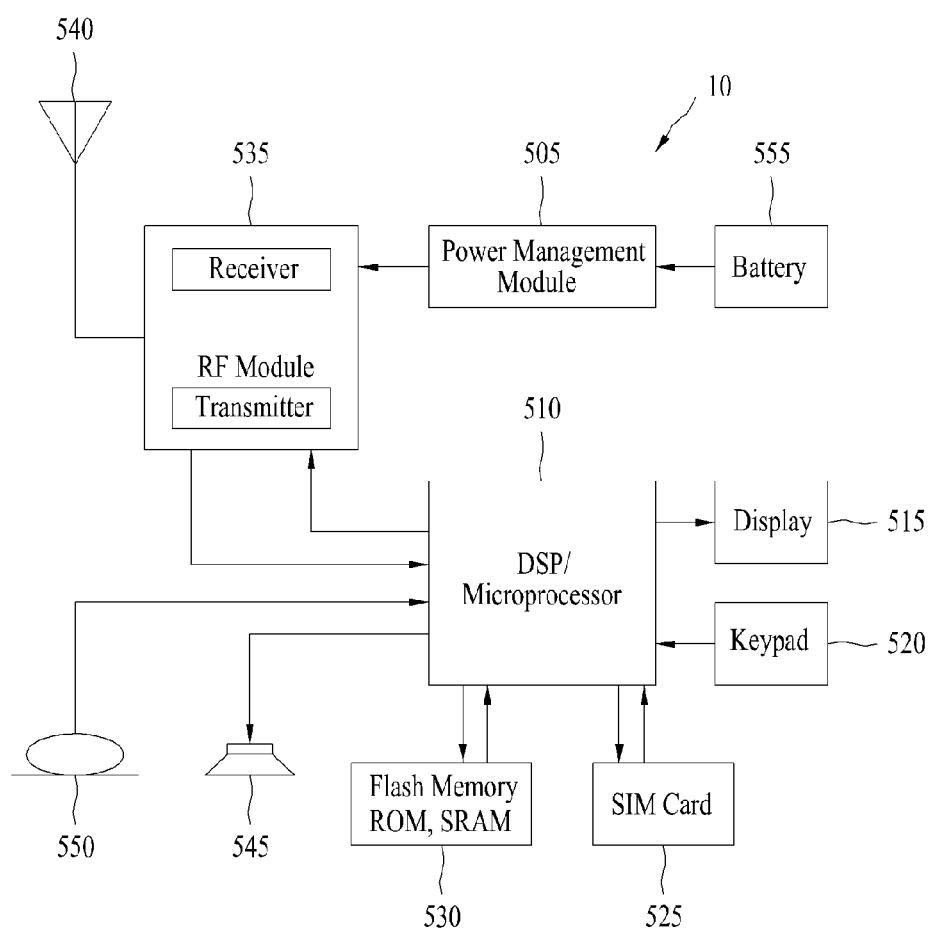
FIG. 13 illustrates a block diagram of a User Equipment (UE).

FIG. 13 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

[Industrial Applicability]

The present invention can be applied to a method and an apparatuses for a proximity-based service, specifically, a proximity-based service for public safety.

The invention claimed is:

1. A method of performing a procedure for a Proximity-based Service (ProSe) by a first ProSe-enabled User Equipment (UE) served by a base station in a cellular communication system, the method performed by the first ProSe-enabled UE and comprising:

receiving system information including authorization of announcing network reachability information from the base station and a number of UE relaying hops allowed from the first ProSe-enabled UE;

measuring a Pa which is a strength of downlink signals received from the base station;

checking whether the first ProSe-enabled UE is near a cell boundary of the base station;

performing a procedure for broadcasting the network reachability information only when the first ProSe-enabled UE determines that the first ProSe-enabled UE is near the cell boundary of the base station, wherein the network reachability information includes a hop count used to indicate a maximum number of the number of UE relaying hops allowed; and receiving, from a second ProSe-enabled UE which is an out-of-coverage ProSe-enabled UE, a request for connecting with the base station via the first ProSe-enabled UE, wherein the first ProSe-enabled UE determines that the first ProSe-enabled UE is near the cell boundary of the base station when the Pa is lower than a first threshold value for a predetermined period.

2. The method of claim 1, wherein the network reachability information includes identification information for the first ProSe-enabled UE.

3. The method of claim 1, wherein the request includes information indicating whether the second ProSe-enabled UE is served by another base station or not, wherein if the second ProSe-enabled UE is served by the another base station, the request is discarded by the first ProSe-enabled UE, and wherein if the second ProSe-enabled UE is not served by the another base station, a response including information indicating whether the request is granted or not is transmitted to the second ProSe-enabled UE by the first ProSe-enabled UE.

4. The method of claim 1, wherein the request includes information indicating a Pb which is a strength of downlink signals from another base station measured by the second ProSe-enabled UE, wherein if a value of (Pa−Pb), which is a subtraction of the Pb from the Pa, is lower than a second threshold value, the request is discarded by the first ProSe-enabled UE, wherein if the value of (Pa−Pb) is greater than or equal to the second threshold value, a response including information indicating whether the request is granted or not is transmitted to the second ProSe-enabled UE by the first ProSe-enabled UE.

5. The method of claim 1, wherein transmission power of the network reachability information is related to the Pa.

6. A first ProSe-enabled User Equipment (UE) configured to perform a procedure for a ProSe in a cellular communication system, wherein the first ProSe-enabled UE is served by a base station, the first ProSe-enabled UE comprising:
a radio frequency (RF) unit; and
a processor, wherein the processor is configured to:
receive system information including authorization of announcing network reachability information from the base station and a number of UE relaying hops allowed from the first ProSe-enabled UE,
measure a Pa which is a strength of downlink signals received from the base station,
check whether the first ProSe-enabled UE is near a cell boundary of the base station,
perform a procedure for broadcasting the network reachability information only when the first ProSe-enabled UE determines that the first ProSe-enabled UE is near the cell boundary of the base station, wherein the network reachability information includes a hop count used to indicate a maximum number of the number of UE relaying hops allowed, and receive, from a second ProSe-enabled UE which is an out-of-coverage ProSe-enabled UE, a request for connecting with the base station via the first ProSe-enabled UE, wherein the first ProSe-enabled UE determines that the first ProSe-enabled UE is near the cell boundary of the base station when the Pa is lower than a first threshold value for a predetermined period.

7. The first ProSe-enabled UE of claim 6, wherein the network reachability information includes identification information for the first ProSe-enabled UE.

8. The first ProSe-enabled UE of claim 6, wherein the request includes information indicating whether the second ProSe-enabled UE is served by another base station or not, wherein if the second ProSe-enabled UE is served by the another base station, the request is discarded by the first ProSe-enabled UE, wherein if the second ProSe-enabled UE is not served by the another base station, a response including information indicating whether the request is granted or not is transmitted to the second ProSe-enabled UE by the first ProSe-enabled UE.

9. The first ProSe-enabled UE of claim 6, wherein the request includes information indicating a Pb which is a strength of downlink signals from another base station measured by the second ProSe-enabled UE, wherein if a value of (Pa−Pb), which is a subtraction of the Pb from the Pa, is lower than a second threshold value, the request is discarded by the first ProSe-enabled UE, and wherein if the value of (Pa−Pb) is greater than or equal to the second threshold value, a response including information indicating whether the request is granted or not is transmitted to the second ProSe-enabled UE by the first ProSe-enabled UE.

10. The first ProSe-enabled UE of claim 6, wherein transmission power of the network reachability information is related to the Pa.

* * * * *